(12) United States Patent
Lee et al.

(10) Patent No.: US 7,470,887 B2
(45) Date of Patent: Dec. 30, 2008

(54) COLLAPSIBLE STRUCTURE FOR OPTICAL NAVIGATION SYSTEM

(75) Inventors: Sai Mun Lee, Penang (MY); Li Chong Tai, Penang (MY); Hun Kwang Lee, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 192 days.

(21) Appl. No.: 11/438,867

(22) Filed: May 23, 2006

(65) Prior Publication Data

US 2007/0272845 A1 Nov. 29, 2007

(51) Int. Cl.
*G06F 3/033* (2006.01)

(52) U.S. Cl. .................. 250/221; 345/163; 345/166

(58) Field of Classification Search .............. 250/221; 345/163, 165, 166
See application file for complete search history.

(56) References Cited

U.S. PATENT DOCUMENTS

| 5,644,139 | A | 7/1997 | Allen et al. |
| 6,222,174 | B1 | 4/2001 | Tullis et al. |
| 6,970,156 | B1* | 11/2005 | Silverstein ................. 345/163 |
| 7,233,319 | B2* | 6/2007 | Johnson et al. ............. 345/166 |
| 2004/0084610 | A1 | 5/2004 | Leong et al. |
| 2004/0189593 | A1 | 9/2004 | Koay |
| 2006/0187208 | A1* | 8/2006 | Wenstrand et al. .......... 345/166 |

* cited by examiner

*Primary Examiner*—Stephen Yam

(57) ABSTRACT

A system for optical navigation includes an optical navigation sensor integrated circuit (IC) configured to generate image information for use in navigation sensing and a collapsible structure which sets the distance between the optical navigation sensor IC and a navigation surface and which can be expanded or collapsed as needed. The collapsible structure includes a collapse system configured to allow the collapsible structure to be in an expanded state or a collapsed state. The collapse structure has a smaller profile dimension in the collapsed state than in the expanded state. The collapsible structure is placed in the expanded state for navigation sensing and in the collapsed state for storage and/or charging.

15 Claims, 7 Drawing Sheets

COLLAPSIBLE STRUCTURE FOR OPTICAL NAVIGATION SYSTEM

BACKGROUND OF THE INVENTION

An optical navigation device, such as an optical mouse, typically includes an optical navigation sensor integrated circuit (IC) that functions as a miniature digital camera to continually collect images of a surface that the device is resting upon and to determine the speed and direction that the device is being moved across the surface by comparing sequentially recorded frames of image information. Image frames are collected at a very high rate, such as 1,500 image frames per second, and the resolution of the optical navigation sensor IC is high enough to detect very small movements of the device relative to the navigation surface.

Collecting image information from the navigation surface involves illuminating the navigation surface and focusing light that reflects off the navigation surface onto the optical navigation sensor IC. Typically, the optical navigation sensor IC, an illumination source, and an optical component such as a lens are integrated into a module that fixes the distance between the lens and the navigation surface at the focal length of the lens. Fixing the distance between the lens and the navigation surface at the focal length of the lens ensures that the collected image information is of sufficient quality for optical navigation.

In some applications, it is desirable to have a "thin" optical navigation device that can be, for example, placed into a slot of a laptop or hand-held computer for storage and/or charging. While current optical navigation devices work well, the size of the navigation device is a function of the focal length of the lens, which dictates the required distance between the lens and the navigation surface. In view of this, what is needed is a system for optical navigation that can collect image information sufficient for optical navigation and that is small enough for desired applications.

SUMMARY OF THE INVENTION

A system for optical navigation includes an optical navigation sensor integrated circuit (IC) configured to generate image information for use in navigation sensing and a collapsible structure which sets the distance between the optical navigation sensor IC and a navigation surface and which can be expanded or collapsed as needed. The collapsible structure includes a collapse system configured to allow the collapsible structure to be in an expanded state or a collapsed state. The collapse structure has a smaller profile dimension in the collapsed state than in the expanded state. The collapsible structure is placed in the expanded state for navigation sensing and in the collapsed state for storage and/or charging.

In an embodiment, the collapsible structure includes a lens configured to focus light, which is reflected off the navigation surface, to the optical navigation sensor IC. The lens is positioned within the collapsible structure such that the navigation surface is located at the focal length of the lens when the collapse system is in the expanded state.

In an embodiment, the collapse system of the collapsible structure includes a fixed piece, a floating piece, and at least one expansion member positioned to exert a separating force on both the fixed and floating pieces. Further, the fixed piece can be made of an optically transparent material with the lens integrated into the fixed piece. The fixed piece may also include an integrated illumination channel positioned to direct light from a light source to the navigation surface.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description similar reference numbers may be used to identify similar elements.

DETAILED DESCRIPTION OF THE INVENTION

A system for optical navigation includes an optical navigation sensor integrated circuit (IC) configured to generate image information for use in navigation sensing and a collapsible structure which sets the distance between the optical navigation sensor IC and a navigation surface and which can be expanded or collapsed as needed. The collapsible structure includes a collapse system configured to allow the collapsible structure to be in an expanded state or a collapsed state. The collapse structure has a smaller profile dimension in the collapsed state than in the expanded state. The collapsible structure is placed in the expanded state for navigation sensing and in the collapsed state for storage and/or charging.

Figures 1, 2A:
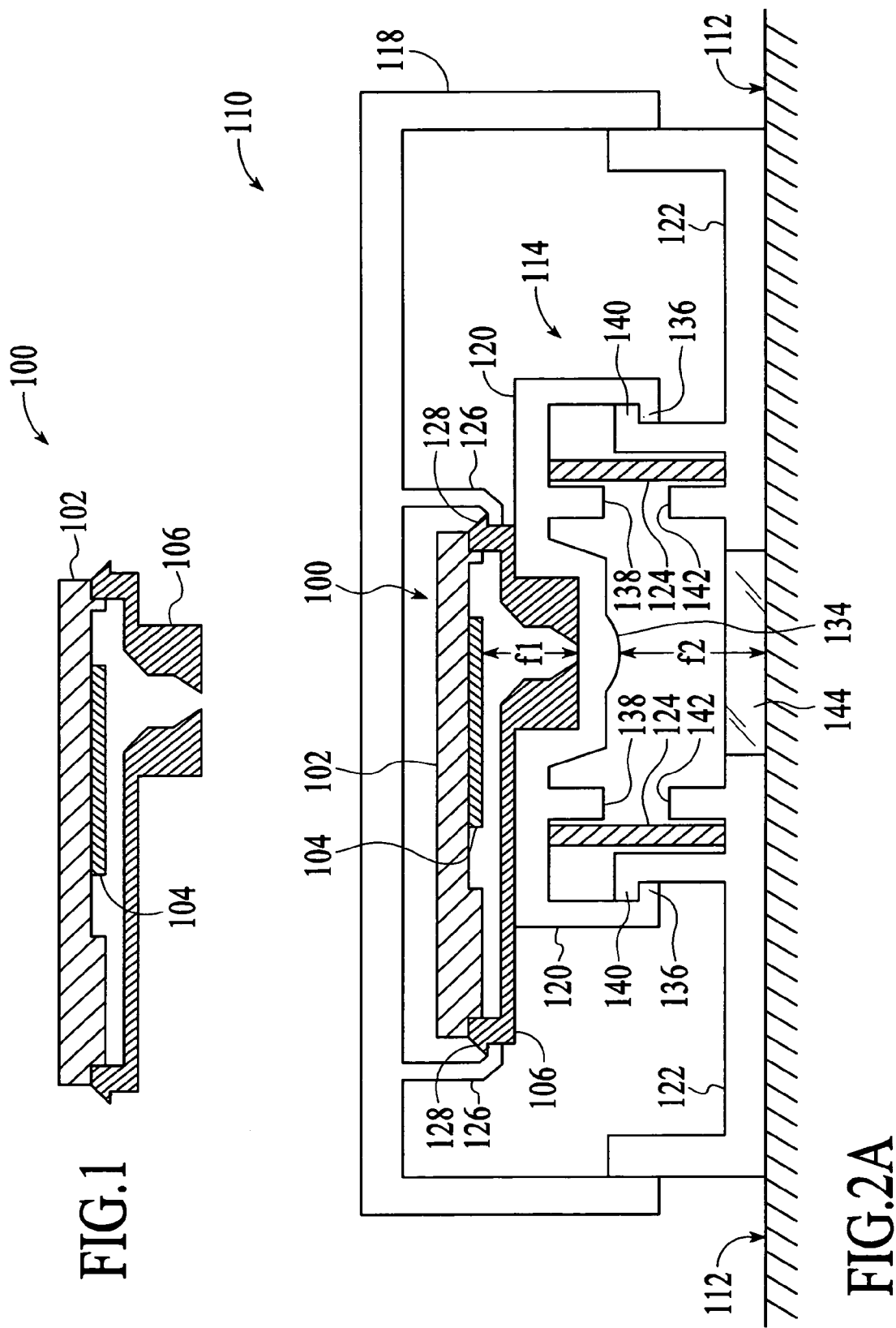
FIG. 1 depicts a navigation sensor module that is integrated into an optical navigation system.
FIG. 2A depicts a side sectional view of a first embodiment of an optical navigation system resting on a navigation surface.

FIG. 1 depicts a navigation sensor module 100 that is integrated into an optical navigation system as described below. The navigation sensor module includes a sensor base 102, an optical navigation sensor IC 104 attached to the sensor base, and an aperture plate 106. The optical navigation sensor IC is an array of distinct photodetectors, for example, a 16×16 or 32×32 array of distinct photodetectors configured to detect light that is reflected from an illuminated spot on a navigation surface. Each of the photodetectors in the array generates light intensity information that is output as a digital value (e.g., an 8-bit digital value). Image information is captured in frames, where a frame of image information includes a set of simultaneously captured values for each distinct photodetector in the array. Image frames captured by the image sensor include data that represents features on the surface upon which the corresponding navigation device sits. The rate of image frame capture is programmable and, for example, ranges up to 2,300 frames per second. In an embodiment, the image sensor has a resolution of 800 characters per inch (cpi).

The navigation sensor IC 104 may include a tracking engine which compares successive image frames to determine the movement of image features between frames. In particular, the tracking engine determines movement by correlating common features that exist in successive image frames. The movement between image frames is expressed in terms of movement vectors in, for example, X and Y directions (e.g., ΔX and ΔY). The movement vectors are then used to determine the movement of the optical navigation sensor IC relative to the navigation surface. More detailed descriptions of exemplary image-based movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

In an embodiment, the sensor base 102 includes electrical channels (not shown) that are electrically connected to the optical navigation sensor IC 104 and the aperture plate 106 includes an aperture through which reflected light from a navigation surface passes. The sensor base is attached to the aperture plate and the combination of the sensor base and the aperture plate encloses the optical navigation sensor IC except for the aperture.

FIG. 2A depicts a side sectional view of a first embodiment of an optical navigation system 110 resting on a navigation surface 112. The optical navigation system includes a collapsible structure 114 that enables the optical navigation system to be in an expanded state or a collapsed state. In FIG. 2A, the optical navigation system is shown in an expanded state. The optical navigation system includes the navigation sensor module 100 from FIG. 1, a housing 118, and a collapsible structure that has a fixed piece 120, a floating piece 122, and at least one expansion member 124.

As depicted in FIG. 2A, the navigation sensor module is attached to the housing 118 by clips 126 and 128 that extend from the housing and from the navigation sensor module. Although the housing and navigation sensor module are connected to each other by clips, other techniques can be used to connect the housing and navigation sensor module to each other. Additionally, although the housing and navigation sensor module are shown as being directly connected to each other, the housing and navigation sensor module may be connected to each other through some other intermediate element or elements.

Referring now to the collapsible structure 114, the fixed piece 120 of the collapsible structure includes a lens 134, expand stopper members 136, and collapse stopper members 138 and the floating piece 122 includes expand stopper members 140 and collapse stopper members 142. The floating piece also has a transparent opening 144 that exposes the navigation surface 112 to the lens 134 and to the optical navigation sensor IC 104. In an embodiment, the transparent opening is filled with an optically transparent member that allows light to reflect off the navigation surface towards the lens and the optical navigation sensor IC. Alternatively, the opening may be void of structural elements. The lens is integrated into the fixed piece and has a sensor focal length ($f_1$) and a surface focal length ($f_2$). The sensor focal length of the lens ($f_1$) is the focal length in the direction of the optical navigation sensor IC and the navigation focal length of the lens ($f_2$) is the focal length in the direction of the navigation surface 112. When the optical navigation sensor IC and the navigation surface are at the respective focal lengths of the lens, image information with sufficient quality for navigation can be generated. In the embodiment of FIG. 2A, the fixed piece is formed of an optical grade transparent material, such as polycarbonate or acrylic, and the lens is formed integral with the fixed piece.

In the embodiment of FIG. 2A, the navigation sensor module 100 and fixed piece 120 are configured such that the optical navigation sensor IC 104 and lens 134 are separated by the sensor focal length ($f_1$). That is, the optical navigation sensor IC and lens are positioned relative to each other such that light passing through the lens from the navigation surface 112 is focused at the surface of the optical navigation sensor IC.

Expansion members 124 are located between the fixed and floating pieces 120 and 122 of the collapsible structure 114 and exert a separating force on the fixed and floating pieces. As depicted in FIG. 2A, the expand stopper members 136 and 140 of the fixed and floating pieces are configured such that they engage each other when the collapsible structure is in the expanded state and prevent the fixed and floating pieces from separating any further as a result of the separating force exerted by the expansion members. The collapsible structure, including the fixed piece, the floating piece, the expand stopper members, the collapse stopper members 138 and 142, and the expansion members, are referred to collectively as the "collapse system." In accordance with an embodiment of the invention, the collapse system is configured such that the distance between the lens and the navigation surface is set at the navigation focal length when the collapsible structure is in the expanded state.

Figure 2B:
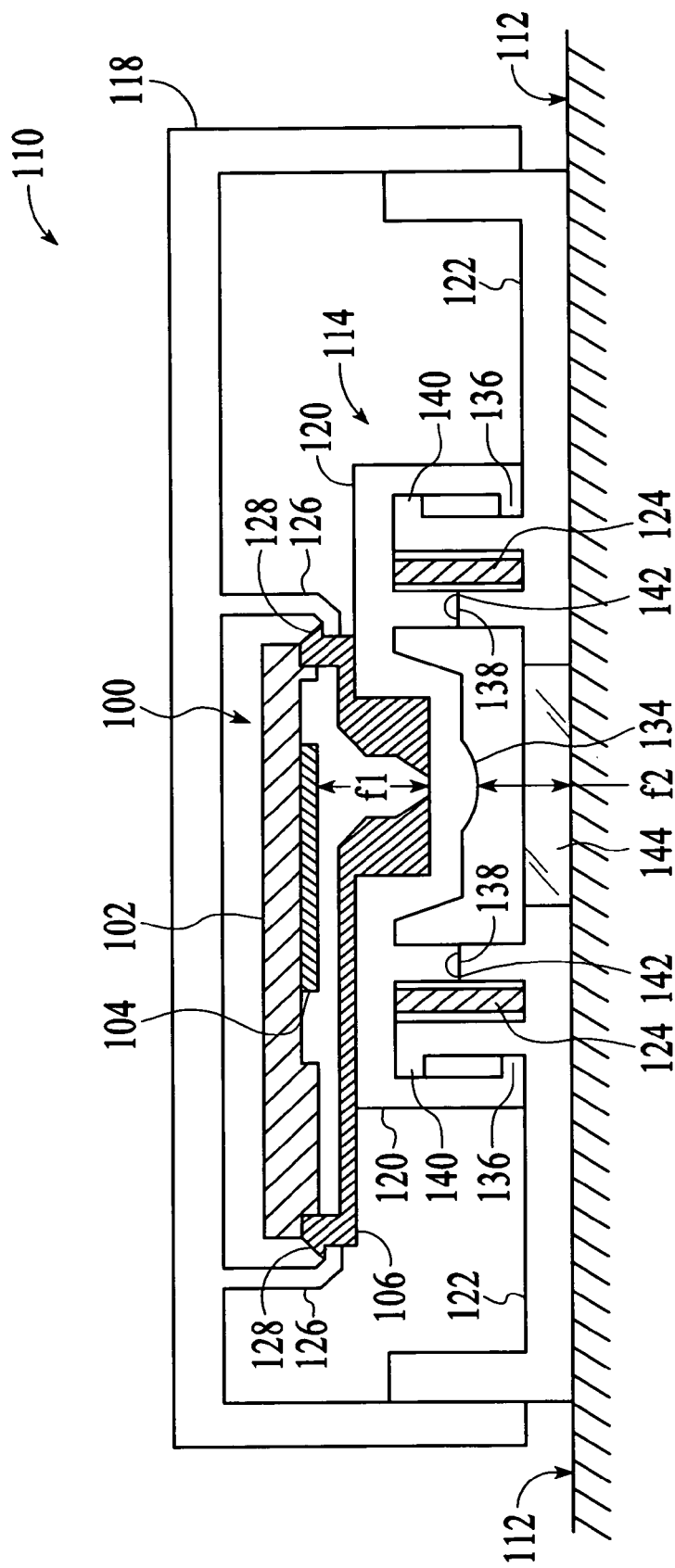
FIG. 2B depicts the embodiment of the optical navigation system from FIG. 2A when the collapsible structure is in the collapsed state as opposed to the expanded state.

FIG. 2B depicts the embodiment of the optical navigation system 110 from FIG. 2A when the collapsible structure 114 is in the collapsed state as opposed to the expanded state. As depicted in FIG. 2B, when the collapsible structure is in the collapsed state, the collapse stopper members 138 and 142 of the fixed and floating pieces 120 and 122 of the collapsible structure are configured such that they engage each other and prevent the fixed and floating pieces from collapsing any further. When the collapsible structure is in the collapsed state, the distance between the lens 134 and the navigation surface 112 is set at less than the navigation focal length ($f_2$). Because the distance between the lens and the navigation surface is less than the navigation focal length, the image information generated by the optical navigation sensor IC will likely not be of sufficient quality to support optical navigation.

In an alternative embodiment, the expand stopper members 136 and 140 of the fixed and floating pieces 120 and 122 are slightly longer than those shown in the embodiment of FIGS. 2A and 2B. In particular, the expand stopper members are configured such they engage the fixed and floating pieces, respectively, when the collapsible structure is in the collapsed state. In such an embodiment, the expand stopper members serve as both expand stopper and collapse stopper members.

As stated above, the function of the expansion member or members 124 is to exert a separating force on the fixed and floating pieces 120 and 122. The expansion members can be any elements that are able to exert the needed separating force. For example, the expansion members may include an elastic member, a spring, magnets or other suitable elements.

Figure 2C:
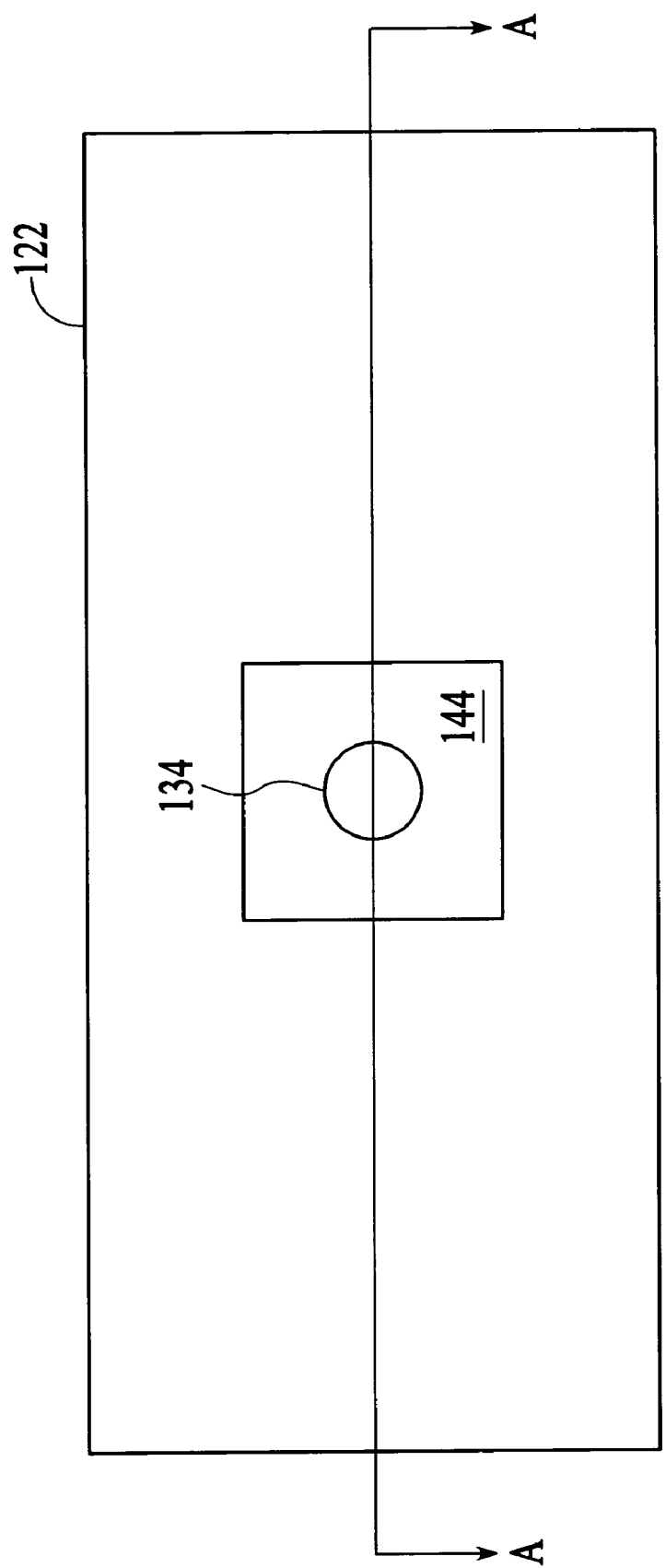
FIG. 2C depicts a bottom view of the optical navigation system of FIGS. 2A and 2B.

FIG. 2C depicts a bottom view of the optical navigation system 110 of FIGS. 2A and 2B. Visible from the bottom view of the optical navigation system are the floating piece 122, the transparent opening 144 in the floating piece and the lens 134 of the fixed piece. The side sectional view of FIGS. 2A and 2B are taken approximately at section line A-A of FIG. 2C.

Although an embodiment of a collapsible structure 114 and associated collapse system are described with reference to FIGS. 2A-2C, there are many different possible configurations of the collapsible structure and collapse system that will enable the profile of the collapsible structure to be changed.

Figure 3A:
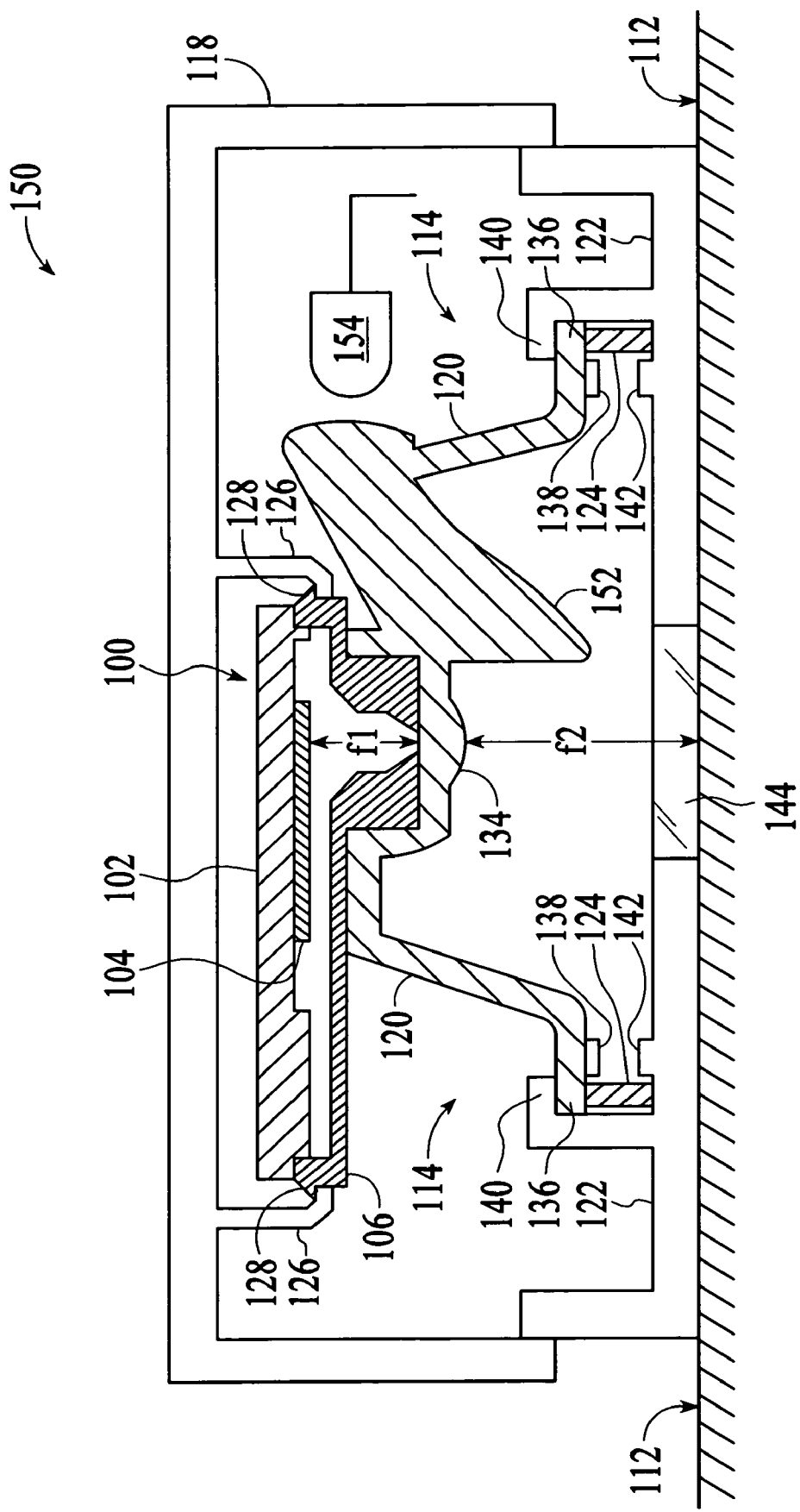
FIGS. 3A and 3B depict side sectional views of an embodiment of an optical navigation system that includes an illumination channel integrated with the collapsible structure.
Figure 3B:
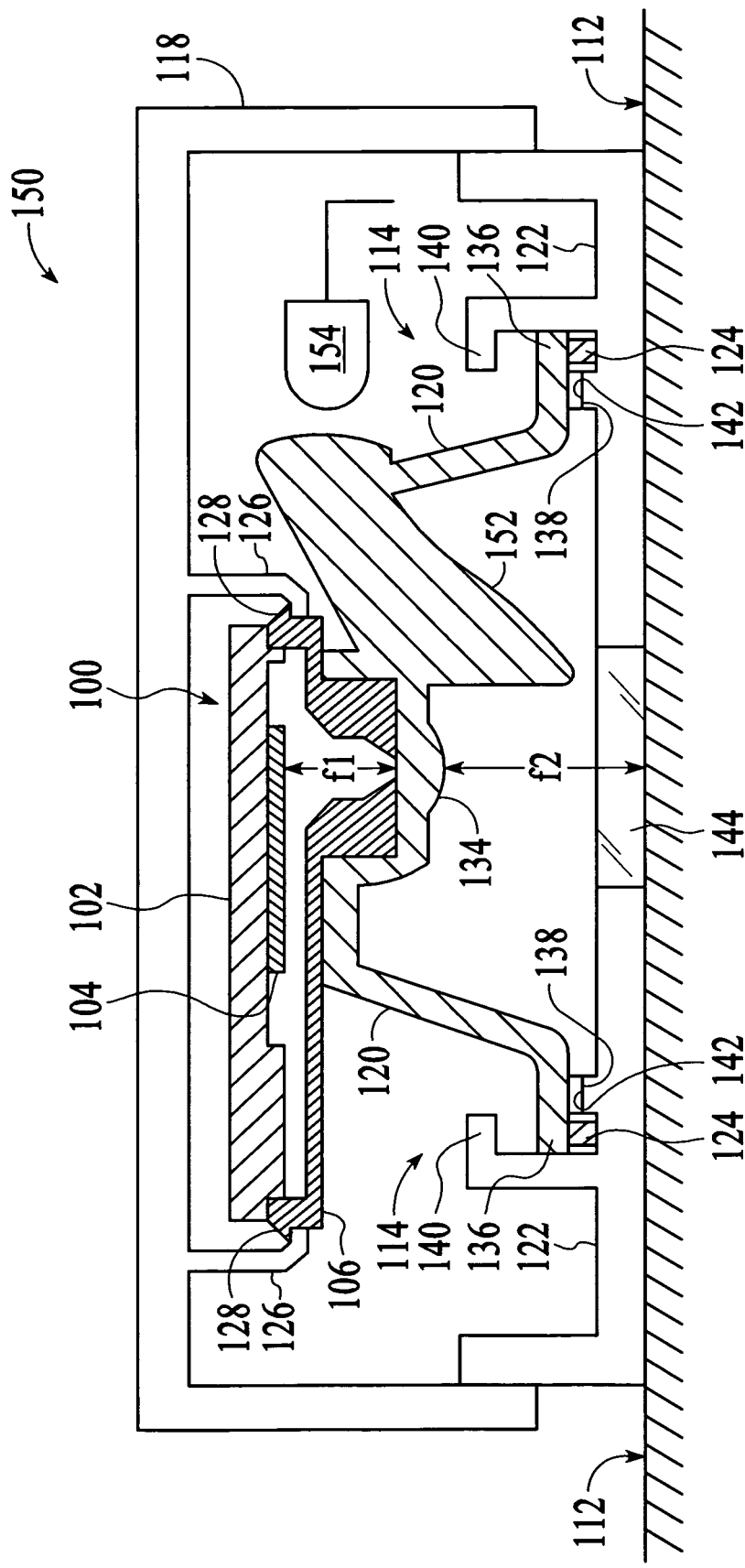

An illumination channel can be used to properly illuminate a spot on the navigation surface upon which an optical navigation sensor sits. FIGS. 3A and 3B depict side sectional views of an embodiment of an optical navigation system 150 that includes an illumination channel 152 integrated with the collapsible structure 114. FIG. 3A depicts the optical navigation system in an expanded state and FIG. 3B depicts the optical navigation system in a collapsed state. The collapsible structure includes a fixed piece 120, a floating piece 122, and expansion members 124 similar to those described with reference to FIGS. 2A and 2B except that the fixed piece includes the illumination channel formed into a single monolithic element.

The illumination channel 152 directs light from a light source 154, such as an LED, onto the navigation surface 142. In an embodiment, the illumination channel is configured to illuminate a spot on the navigation surface of approximately two square millimeters when the optical navigation system sits on top of the navigation surface. Further, the illumination channel is configured to dictate the angle of incidence of the light.

As depicted in FIG. 3A, the navigation sensor module 100 is attached to the housing 118 by clips 126 and 128 that extend from the housing and from the navigation sensor module. Although the housing and navigation sensor module are connected to each other by clips, other techniques can be used to connect the housing and navigation sensor module to each other. Additionally, although the housing and navigation sensor module are shown as being directly connected to each other, the housing and navigation sensor module may be connected to each other through some other intermediate element or elements.

Referring now to the collapsible structure 114, the fixed piece 120 of the collapsible structure includes the lens 134, the illumination channel 152, expand stopper members 136, and collapse stopper members 138 and the floating piece 122 includes expand stopper members 140 and collapse stopper members 142. The floating piece also has a transparent opening 144 that exposes the navigation surface 112 to the lens 134 and to the optical navigation sensor IC 104. Again, the transparent opening may be filled with an optically transparent material such as glass. In this embodiment, the lens and illumination channel are integrated into the fixed member. When the optical navigation sensor IC and the navigation surface are at the respective focal lengths ($f_1$ and $f_2$) of the lens, image information with sufficient quality for navigation can be generated. In the embodiment of FIG. 3A, the fixed piece is formed of an optical grade transparent material, such as polycarbonate or acrylic, and the lens and illumination channel are formed integral with the fixed piece.

As with the optical navigation system of FIGS. 2A and 2B, the navigation sensor module and fixed piece are configured such that the optical navigation sensor IC 104 and lens 134 are separated by the sensor focal length ($f_1$). That is, the optical navigation sensor IC and lens are positioned relative to each other such that light passing through the lens from the navigation surface 112 is focused at the surface of the optical navigation sensor IC.

Expansion members 124 are located between the fixed and floating pieces 120 and 122 of the collapsible structure 114 such that they exert a separating force on the fixed and floating pieces. As depicted in FIG. 3A, the expand stopper members 136 and 134 of the fixed and floating pieces are configured such that they engage each other when the collapsible structure is in the expanded state and prevent the fixed and floating pieces from separating any further as a result of the separating force exerted by the expansion members.

As depicted in FIG. 3B, when the collapsible structure 114 is in the collapsed state, the collapse stopper members 138 and 142 of the fixed and floating pieces 120 and 122 of the collapsible structure are configured such that they engage each other and prevent the fixed and floating pieces from collapsing any further. In the embodiment of FIGS. 3A and 3B, when the collapsible structure is in the collapsed state, the distance between the lens and the navigation surface is set at less than the navigation focal length ($f_2$). As with the optical navigation system of FIGS. 2A and 2B, the elements that enable the collapsible structure to exist in an expanded state and in a collapsed state include the expand stopper members 136 and 140, the collapse stopper members 138 and 142, and the expansion members 124 and are referred to herein collectively as the collapse system.

Figure 4A:
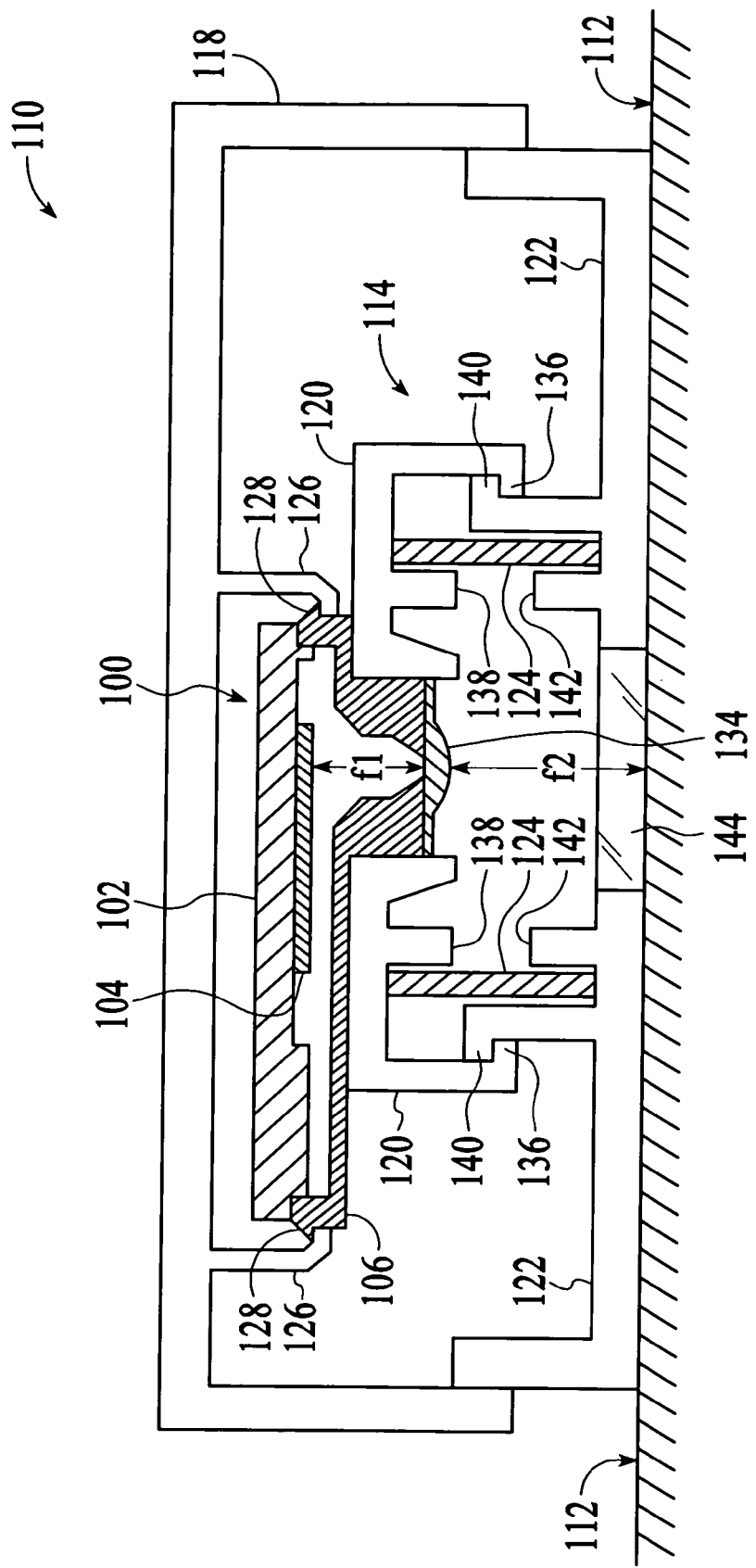
FIGS. 4A and 4B depict side sectional views of an embodiment of an optical navigation system similar to the systems described with reference to FIGS. 2A-3B in which the lens and the fixed piece are not formed as a monolithic element.
Figure 4B:
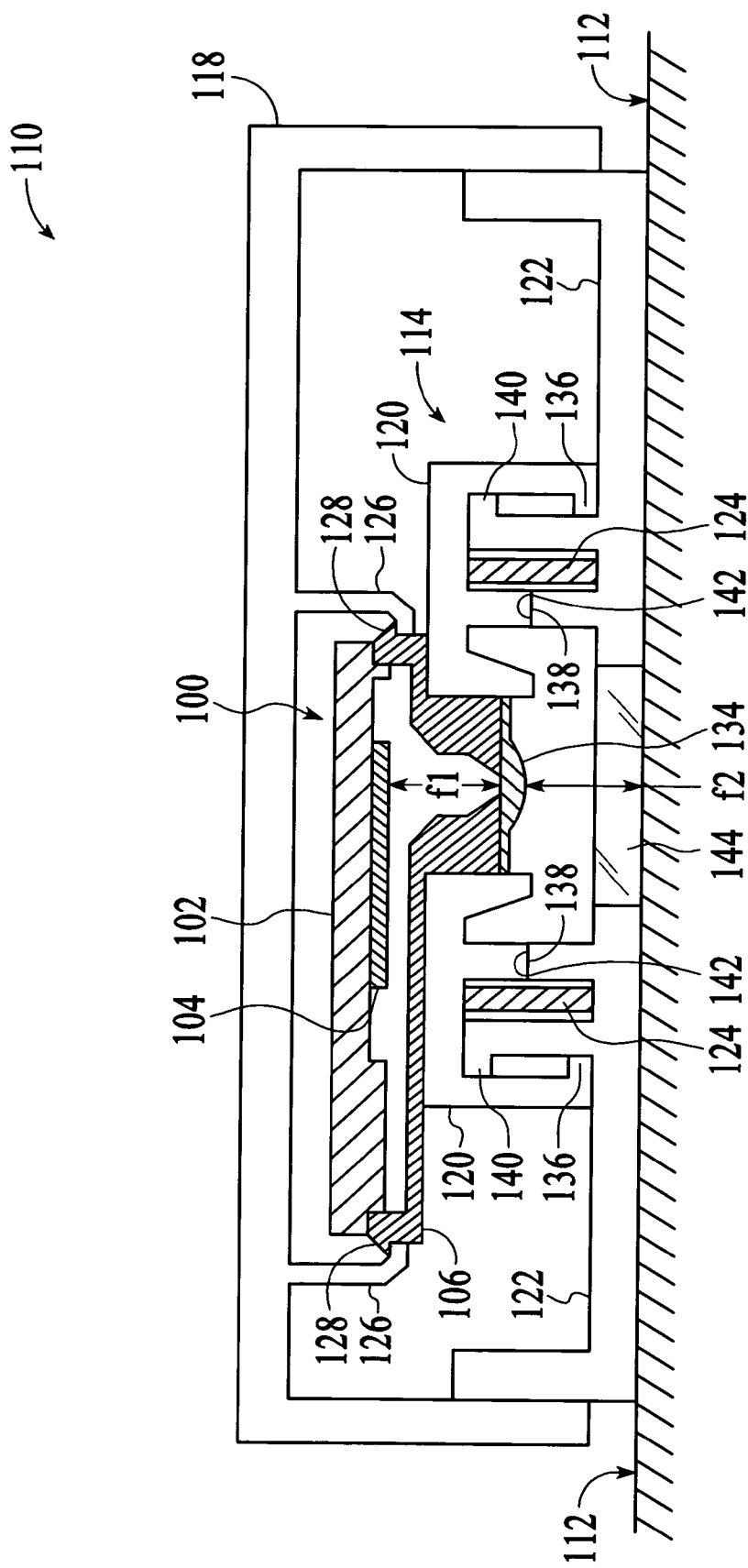

In the embodiments of FIGS. 2A-3B, the fixed piece 120 and the lens 134 are formed as a single monolithic element. In other embodiments, the lens may be separate from and/or attached to the fixed piece. FIGS. 4A and 4B depict side sectional views of an embodiment of an optical navigation system similar to the systems described with reference to FIGS. 2A-3B in which the lens 134 and the fixed piece 120 are not formed as a monolithic element. In the embodiment of FIGS. 4A and 4B, the lens is initially attached to the navigation sensor module before the navigation sensor module is attached to the fixed piece.

Although some exemplary embodiments of an optical navigation system with a collapsible structure have been shown, other embodiments are possible. Additionally, other embodiments of the collapse system are possible.

Although specific embodiments of the invention have been described and illustrated, the invention is not to be limited to the specific forms or arrangements of parts as described and illustrated herein. The invention is limited only by the claims.

What is claimed is:

1. A system for optical navigation comprising:
an optical navigation sensor integrated circuit (IC) configured to generate image information for use in navigation sensing;
a collapsible structure operatively connected to the optical navigation sensor IC and configured to set the distance between the optical navigation sensor IC and a navigation surface, the collapsible structure comprising a collapse system configured to allow the collapsible structure to be in an expanded state or in a collapsed state, wherein:
in the expanded state, the collapsible structure has a profile dimension that sets the distance between the optical navigation sensor IC and a navigation surface to a first distance; and
in the collapsed state, the collapsible structure has a profile dimension that sets the distance between the optical navigation sensor IC and the navigation surface to a second distance, wherein the first distance is greater than the second distance; and
a lens operatively connected to the collapsible structure at a fixed distance from the optical navigation sensor IC and configured to focus light, which is reflected off of the navigation surface, to the optical navigation sensor IC, wherein the fixed distance is the same in the expanded state and the collapsed state;
wherein the collapsible structure comprises a fixed piece that is fixedly connected to the optical navigation sensor IC and near to the optical navigation sensor IC, a floating piece that is movably connected to the optical navigation sensor IC and near to the navigation surface, and an expansion member positioned to exert a separating force on both the fixed piece and the floating piece;

wherein the fixed piece includes an expand stopper member and a collapse stopper member and the floating piece includes an expand stopper member and a collapse stopper member;

wherein the expand stopper members of the fixed and floating pieces are configured such that they engage each other when the collapsible structure is in the expanded state to prevent the fixed and floating pieces from separating any further as a result of the separating force exerted by the expansion members and wherein the expand stopper members are disengaged when the collapse structure is in the collapsed state;

when the collapsible structure is in the collapsed state, the collapse stopper members of the fixed and floating pieces of the collapsible structure are configured such that they engage each other to prevent the fixed and floating pieces from collapsing any further and wherein the collapse stopper members are disengaged when the collapse structure is in the expanded state.

2. The system of claim 1 wherein the first distance is at a focal length of the lens and the second distance is less than the focal length of the lens.

3. The system of claim 1 wherein the lens is integrated into an element of the collapsible structure.

4. The system of claim 1 wherein the fixed piece is an optically transparent material and wherein the lens is integrated into the fixed piece.

5. The system of claim 4 wherein the fixed piece includes an integrated illumination channel positioned to direct light from a light source to the navigation surface, wherein the lens and illumination channel are formed into a single monolithic element.

6. The system of claim 1 wherein the collapsible structure includes an integrated illumination channel positioned to direct light from a light source to the navigation surface.

7. A system for optical navigation comprising:

a navigation sensor module including an optical navigation sensor integrated circuit (IC), the optical navigation sensor IC being configured to generate image information for use in navigation sensing; and a collapsible structure operatively connected to the navigation sensor module, the collapsible structure comprising:

a lens for focusing light, which is reflected off of a navigation surface, to the optical navigation sensor IC, the lens being connected to the collapsible structure at a fixed distance from the optical navigation sensor IC; and a collapse system configured to allow the collapsible structure to be in an expanded state or in a collapsed state, wherein:

in the expanded state, the collapsible structure sets the distance between the lens and the navigation surface to the focal length; and in the collapsed state, the collapsible structure sets the distance between the lens and the navigation surface to less than the focal length;

wherein the fixed distance is the same in the expanded state and the collapsed state;

wherein the collapsible structure comprises a fixed piece that is near to the optical navigation sensor IC, a floating piece that is near to the navigation surface, and an expansion member positioned to exert a separating force on both the fixed piece and the floating piece;

wherein the fixed piece includes an expand stopper member and a collapse stopper member and the floating piece includes an expand stopper member and a collapse stopper member;

wherein the expand stopper members of the fixed and floating pieces are configured such that they engage each other when the collapsible structure is in the expanded state to prevent the fixed and floating pieces from separating any farther as a result of the separating force exerted by the expansion members and wherein the expand stopper members are disengaged when the collapse structure is in the collapsed state;

when the collapsible structure is in the collapsed state, the collapse stopper members of the fixed and floating pieces of the collapsible structure are configured such that they engage each other to prevent the fixed and floating pieces from collapsing any further and wherein the collapse stopper members are disengaged when the collapse structure is in the expanded state.

8. The system of claim 7 wherein the lens is integrated into an element of the collapsible structure.

9. The system of claim 7 wherein the fixed piece is an optically transparent material and wherein the lens is integrated into the fixed piece.

10. The system of claim 9 wherein the fixed piece includes an integrated illumination channel positioned to direct light from a light source to the navigation surface, wherein the lens and illumination channel are formed into a single monolithic element.

11. The system of claim 7 wherein the collapsible structure includes an integrated illumination channel positioned to direct light from a light source to the navigation surface.

12. A system for optical navigation comprising:

a navigation sensor module including an optical navigation sensor integrated circuit (IC), the optical navigation sensor IC being configured to generate image information for use in navigation sensing; and a collapsible structure attached to the navigation sensor module and configured to allow the collapsible structure to be in an expanded state or in a collapsed state, the collapsible structure comprising:

a fixed piece that is near to the optical navigation sensor IC, the fixed piece including an expand stopper member and a collapse stopper member;

a floating piece that is near to the navigation surface, the floating piece including an expand stopper member and a collapse stopper member;

at least one expansion member positioned to exert a separating force on both the fixed piece and the floating piece; and a lens for focusing light, which is reflected off of a navigation surface, to the optical navigation sensor IC, the lens being integrated with the fixed piece into a monolithic element and connected to the collapsible structure at a fixed distance from the optical navigation sensor IC;

wherein:

in the expanded state, the collapsible structure sets the distance between the lens and the navigation surface to a first distance;

in the collapsed state, the collapsible structure sets the distance between the lens and the navigation surface to a second distance that is less than the first distance; and the fixed distance is the same in the expanded state and the collapsed state;

wherein the expand stopper members of the fixed and floating pieces are configured such that they engage each other when the collapsible structure is in the expanded state to prevent the fixed and floating pieces from separating any further as a result of the separating force exerted by the expansion members and wherein the expand stopper members are disengaged when the collapse structure is in the collapsed state;

when the collapsible structure is in the collapsed state, the collapse stopper members of the fixed and floating pieces of the collapsible structure are configured such that they engage each other to prevent the fixed and floating pieces from collapsing any further and wherein the collapse stopper members are disengaged when the collapse structure is in the expanded state.

13. The system of claim 12 wherein the first distance is at a focal length of the lens and the second distance is less than the focal length of the lens.

14. The system of claim 13 wherein the fixed piece includes an integrated illumination channel positioned to direct light from a light source to the navigation surface, wherein the illumination channel is formed into the monolithic element that includes the lens.

15. The system of claim 14 further comprising a light source positioned to provide light to the illumination channel.

* * * * *

UNITED STATES PATENT AND TRADEMARK OFFICE
CERTIFICATE OF CORRECTION

| | |
|---|---|
| PATENT NO. | : 7,470,887 B2 |
| APPLICATION NO. | : 11/438867 |
| DATED | : December 30, 2008 |
| INVENTOR(S) | : Sai Mun Lee et al. |

It is certified that error appears in the above-identified patent and that said Letters Patent is hereby corrected as shown below:

Column 8, Line 9, Claim 7, delete "farther" and insert -- further --.

Signed and Sealed this

Twenty-sixth Day of October, 2010

David J. Kappos
*Director of the United States Patent and Trademark Office*